(12) United States Patent
Thomas (10) Patent No.: US 8,208,962 B2
(45) Date of Patent: Jun. 26, 2012

(54) ANTENNA SYSTEM FOR SHARED OPERATION

(75) Inventor: Louis David Thomas, Malvern (GB)

(73) Assignee: Quintel Technology Limited, Bristol (GB)

( * ) Notice: Subject to any disclaimer, the term of this patent is extended or adjusted under 35 U.S.C. 154(b) by 1490 days.

(21) Appl. No.: 11/632,233

(22) PCT Filed: Jul. 7, 2005

(86) PCT No.: PCT/GB2005/002694
§ 371 (c)(1),
(2), (4) Date: Jan. 10, 2007

(87) PCT Pub. No.: WO2006/008452
PCT Pub. Date: Jan. 26, 2006

(65) Prior Publication Data
US 2008/0026796 A1 Jan. 31, 2008

(30) Foreign Application Priority Data
Jul. 15, 2004 (GB) .................................. 0415811.9

(51) Int. Cl.
*H04M 1/00* (2006.01)
(52) U.S. Cl. .................................................. 455/562.1
(58) Field of Classification Search ........................ None
See application file for complete search history.

(56) References Cited

U.S. PATENT DOCUMENTS

| 5,781,865 A | 7/1998 | Gammon |
| 6,522,642 B1 | 2/2003 | Scott |
| 6,542,519 B1 * | 4/2003 | Almqvist et al. ............. 370/480 |
| 7,069,053 B2 * | 6/2006 | Johannisson et al. ...... 455/562.1 |
| 7,433,713 B2 * | 10/2008 | Haskell et al. ............. 455/562.1 |
| 2004/0137947 A1 | 7/2004 | Nimmo-Smith |

FOREIGN PATENT DOCUMENTS

| WO | WO 92/12579 | 7/1992 |
| WO | WO 02/082581 | 10/2002 |
| WO | WO 03/043127 | 4/2003 |

\* cited by examiner

*Primary Examiner* — Lincoln Donovan
*Assistant Examiner* — Sibin Chen (57) ABSTRACT

An antenna system for shared operation has three antenna stacks each with two mutually orthogonal polarisations (+45 degree and −45 degree). It is for use with multiple base stations. It combines on to a single feeder signals associated with like polarisation and with the base stations, and separates on to different feeders signals associated with different polarisations. This applies both to transmit and receive signals passing between antennas and base stations. Signal combining is achieved by band pass filtering. Each base station transmits and receives via a respective antenna stack, and so each can have an individual angle of electrical tilt. Two, three or four feeders may be used to route signals between antennas and base stations. With four feeders, transmit and receive signals and differing polarisation associations are separable, reducing intermodulation products. With two feeders, transmit and receive signals with like polarisation associations are combined.

11 Claims, 9 Drawing Sheets

Fig.1.
Prior Art: Shared Antenna System With Transmit Polarisation Diversity

ANTENNA SYSTEM FOR SHARED OPERATION

This invention relates an antenna system for shared operation by multiple operators, such as for example (but without limitation) a phased array antenna system having a plurality of antennas, or a single antenna assembly having a plurality of antenna stacks within a radome. The antenna system of the invention is relevant to many telecommunications systems, such as for example cellular mobile radio networks commonly referred to as mobile telephone networks. It is relevant to antenna sharing for first generation (1G) mobile telephone networks such as TACS, second generation (2G) mobile telephone networks such as GSM and D-AMPS (IS136), third generation (3G) mobile telephone networks such as the Universal Mobile Telephone System (UMTS), and other cellular radio networks.

Operators of conventional cellular radio networks generally employ their own base stations each of which is connected to one or more antennas. However, the numbers of cellular radio networks and operators are increasing worldwide: this has led to increases in the number of antenna sites and the number of antennas per site. In consequence, this in turn is leading to planning or zoning restrictions imposed by legal authorities, which are increasingly placing limits on numbers of antenna sites, and on obtrusiveness of antenna structures, in order to minimise visual impact on the environment. Antenna sharing provides a solution to the problem of limiting site and antenna numbers. However, it introduces the problem of increased complexity and bulk of apparatus for signal transfer between base stations and antenna system, and consequent increase in weight supported by, wind loading experienced by and strength required of an antenna support mast. It can also require multiple operators to have a common angle of electrical tilt of an antenna, contrary to a general requirement for each operator to have an individual angle of electrical tilt.

An antenna system for shared operation by multiple operators or base stations is disclosed by European patent no. EP 0 566 603 (inventor E Prokkola). This patent describes multiple base stations of different types (GSM, ETACS, TACS) connected to respective band-pass transmit filters and thence to a common transmit antenna. The problems of increased complexity, common angle electrical tilt and bulk of signal transfer apparatus are not addressed.

As common general knowledge in the field of cellular radio networks, and as will be described later in more detail, it is known to provide a shared antenna system with a respective antenna stack for each co-located base station per sector of antenna coverage. In the case of such a system having transmit and receive diversity (as described later), two signal feeders per sector per base station are required to connect base stations to antenna stacks, each feeder carrying both transmit and receive signals. For three base stations and three sectors, eighteen feeders are required, and thirty-six for six sectors. Despite the large number of feeders, this design does not make it possible to use separate transmit and receive feeders for signals as may be required to attain a low level of interference from intermodulation products, which arise from mixing of different signal frequencies. An antenna system of this general type is disclosed by published international application no. WO 03/043127, but it shows additional feeders being used to separate transmit and receive signals.

In cellular radio networks, a feeder is a coaxial cable weighing typically 1.26 kg/meter and is used to carry signals at a frequency typically in the range 400 MHz to 2 GHz. An antenna mast may be required to support the weight of each feeder, typically 30 meters in length (37.8 kg)—or even up to 60 meters (75.6 kg). Moreover, each feeder increases wind resistance and therefore wind loading on an antenna mast. In consequence, the number of feeders is an important consideration in mast design.

In order to improve transmission performance, it is known to use diversity, i.e. to receive and/or transmit two or more diverse signals. The diverse signals are processed either individually or in combination. There are three common types of diversity in transmit mode, a) frequency diversity, b) spatial diversity and c) polarisation diversity. In transmit mode, a mobile cellular radio handset has a single transmitting antenna which transmits a carrier wave with a single polarisation. A base station uses a dual polarisation antenna with one antenna element (or set of elements) having a +45 degree polarisation and the other −45 degree polarisation. One signal from the handset therefore gives rise to two signals at the antenna. The base station processes both receive signals in order to obtain the best signal. This approach combats changes in the polarisation of radio signals due to different orientations of the mobile antenna and reflection at buildings etc., which cause signals to be received at a base station antenna with multiple polarisations.

In polarisation diversity used for transmit mode, a base station transmits one signal on a +45 degrees antenna element and another signal on a −45 degrees antenna element. The two signals have the same carrier frequency but different modulations. A mobile cellular radio handset receives the two signals on a single antenna, but since they are modulated differently a handset can process them to obtain improved reception. Cellular radio systems have used base station receive diversity for some time, and transmit diversity is now being considered as a means of further improving transmission performance.

The present invention provides an antenna system for shared operation having a plurality of antennas for use with multiple base stations, characterised in that each antenna is arranged to transmit and receive for at least one respective base station, the antenna system is arranged to combine on to a single feeder signals with different non-contiguous frequencies associated with a plurality of the base stations, and to separate on to different feeders signals with contiguous or overlapping or like frequencies for at least one of transfer of signals from antennas to base stations in receive mode and transfer of signals from base stations to antennas in transmit mode.

Here an antenna may be a single phased array antenna, or antenna stack, mounted in a single radome, or multi-phased array antennas, or antenna stacks, mounted either in a single radome, or multiple radomes.

The invention provides the advantage that it reduces the number of feeders required compared to comparable prior art, while preserving capability for having different angles of electrical tilt at different antennas should this be required. Moreover, it may be configured to provide one antenna per operator, in which case an individual angle of electrical tilt is obtainable for each operator.

The antenna system may be arranged to combine on to a single feeder transmit and receive signals associated with like polarisation and with a plurality of base stations, and to separate on to different feeders transmit and receive signals associated with different polarisations. It may have:

a) one bandpass filter per base station per polarisation for combining base station transmit signals on to feeders;

b) one bandpass filter per antenna per polarisation for separating base station transmit signals for routing to different antennas; and c) two bandpass filters and a low noise amplifier per antenna per polarisation for combining antenna receive signals on to feeders.

The antenna system may be arranged to combine transmit signals on to different feeders to receive signals. It may have:
a) one bandpass filter per base station per polarisation for combining base station transmit signals on to feeders;
b) one bandpass filter per antenna per polarisation for separating base station transmit signals for routing to different antennas;
c) one bandpass filter and one low noise amplifier per antenna per polarisation and one combiner per polarisation for combining antenna receive signals on to feeders; and
d) one splitter per polarisation for routing antenna receive signals from feeders to different base stations.

The antenna system may be arranged to:
a) combine base station transmit signals associated with like polarisation on to a single feeder;
b) combine antenna receive signals associated with like polarisation on to a single feeder;
c) separate base station transmit signals associated with different polarisations on to different feeders; and
d) separate antenna receive signals associated with different polarisations on to different feeders.

The antenna system may arranged for receive diversity but not transmit diversity, and to implement this by combining on to a single feeder transmit and receive signals associated with one polarisation and by separating on to another feeder receive signals associated with a different polarisation. It may have:
a) one bandpass filter per base station for combining base station transmit signals on to a first feeder;
b) one bandpass filter per antenna for separating base station transmit signals for routing to different antennas;
c) two bandpass filters and a low noise amplifier per antenna for combining antenna receive signals of one polarisation on to a feeder also arranged to carry transmit signals associated with like polarisation; and
d) one bandpass filter and one low noise amplifier per antenna and one combiner for combining antenna receive signals associated with another polarisation on to a feeder, and one splitter for routing such receive signals from the feeder to different base stations.

The antenna system may be arranged for receive diversity but not transmit diversity; it may be arranged to separate on to different feeders transmit and receive signals and also receive signals associated with different polarisations. It may have:
a) one bandpass filter per base station for combining base station transmit signals on to a first feeder;
b) one bandpass filter per antenna for separating base station transmit signals for routing to different antennas;
c) a bandpass filter and a low noise amplifier per antenna for combining antenna receive signals associated with one polarisation on to a second feeder; and
d) one bandpass filter and one low noise amplifier per antenna and one combiner for combining antenna receive signals of another polarisation on to a third feeder, and one splitter for routing such receive signals from the third feeder to different base stations.

Each base station may have a respective transmit/receive band spaced from another such band by an intervening gap, and frequencies of pairs of transmit and receive signals may be arranged for duplex filtering with intervening frequency differences which are equal to at least the combined width of a gap and a band.

In another aspect, the present invention provides an antenna system for shared operation having a plurality of antennas arranged to implement diversity and for use with multiple base stations, characterised in that the antenna system is arranged to combine on to a single feeder signals associated both with like diversity type and with a plurality of base stations, and to separate on to different feeders signals associated with different diversity types for at least one of transfer of signals from antennas to base stations in receive mode and transfer of signals from base stations to antennas in transmit mode.

Here the expression "diversity type" means polarisation in the case of polarisation diversity and source or destination antenna for spatial diversity. In this aspect the invention provides the advantage that it requires relatively few feeders despite incorporating diversity.

In a further aspect, the present invention provides an antenna system for shared operation having a plurality of antennas each associated with a plurality of polarisations for use with multiple base stations, characterised in that the antenna system is arranged to combine on to a single feeder (62, 64) signals associated both with like polarisation and with a plurality of base stations (51 to 53), and to separate on to different feeders (62, 64) signals associated with different polarisations for at least one of transfer of signals from antennas (AS1 to AS3) to base stations (51 to 53) in receive mode and transfer of signals from base stations (51 to 53) to antennas (AS1 to AS3) in transmit mode.

In this aspect the invention provides the advantage that it requires relatively few feeders despite incorporating polarisation diversity.

In an alternative aspect, the present invention provides a method of shared operation of an antenna assembly having a plurality of antennas for use with multiple base stations, characterised in that each antenna is arranged to transmit and receive for at least one respective base station and the method includes combining on to a single feeder signals with different non-contiguous frequencies associated with a plurality of the base stations, and to separate on to different feeders signals with contiguous or overlapping or like frequencies for at least one of transfer of signals from antennas to base stations in receive mode and transfer of signals from base stations to antennas (AS1 to AS3) in transmit mode.

The method may include combining on to a single feeder transmit and receive signals associated with like polarisation and with a plurality of base stations, and separating on to different feeders transmit and receive signals associated with different polarisations. It may be implemented using:
a) one bandpass filter per base station per polarisation for combining base station transmit signals on to feeders;
b) one bandpass filter per antenna per polarisation for separating base station transmit signals for routing to different antennas; and
c) two bandpass filters and a low noise amplifier per antenna per polarisation for combining antenna receive signals on to feeders.

The method may include combining transmit signals on to different feeders to receive signals. It may be implemented using:
a) one bandpass filter per base station per polarisation for combining base station transmit signals on to feeders;
b) one bandpass filter per antenna per polarisation for separating base station transmit signals for routing to different antennas;

c) one bandpass filter and one low noise amplifier per antenna per polarisation and one combiner per polarisation for combining antenna receive signals on to feeders; and d) one splitter per polarisation for routing antenna receive signals from feeders to different base stations.

The method may include:

a) combining base station transmit signals associated with like polarisation on to a single feeder;

b) combining antenna receive signals associated with like polarisation on to a single feeder;

c) separating base station transmit signals associated with different polarisations on to different feeders; and d) separating antenna receive signals associated with different polarisations on to different feeders.

The method may implement receive diversity but not transmit diversity, and may include combining on to a single feeder transmit and receive signals associated with one polarisation and separating on to another feeder receive signals associated with a different polarisation. It may be implemented using:

a) one bandpass filter per base station for combining base station transmit signals on to a first feeder;

b) one bandpass filter per antenna for separating base station transmit signals for routing to different antennas;

c) two bandpass filters and a low noise amplifier per antenna for combining antenna receive signals of one polarisation on to a feeder also arranged to carry transmit signals associated with like polarisation; and d) one bandpass filter and one low noise amplifier per antenna and one combiner for combining antenna receive signals associated with another polarisation on to a feeder, and one splitter for routing such receive signals from the feeder to different base stations.

The method may implement receive diversity but not transmit diversity and include separating on to different feeders transmit and receive signals and also receive signals associated with different polarisations. It may be implemented using:

a) one bandpass filter per base station for combining base station transmit signals on to a first feeder;

b) one bandpass filter per antenna for separating base station transmit signals for routing to different antennas;

c) a bandpass filter and a low noise amplifier per antenna for combining antenna receive signals associated with one polarisation on to a second feeder; and d) one bandpass filter and one low noise amplifier per antenna and one combiner for combining antenna receive signals of another polarisation on to a third feeder, and one splitter for routing such receive signals from the third feeder to different base stations.

Each base station may have a respective transmit/receive band spaced from another such band by an intervening gap, and the method may include arranging frequencies of pairs of transmit and receive signals for duplex filtering with intervening frequency differences which are equal to at least the combined width of a gap and a band.

In a further alternative aspect, the present invention provides a method of shared operation of an antenna system incorporating an antenna assembly having a plurality of antennas arranged to implement diversity and for use with multiple base stations, characterised in that the method includes combining on to a single feeder signals associated both with like diversity type and with a plurality of base stations, and to separate, on to different feeders signals associated with different diversity types for at least one of transfer of signals from antennas to base stations in receive mode and transfer of signals from base stations to antennas in transmit mode.

In another alternative aspect, the present invention provides a method of shared operation of an antenna system with multiple base stations, the antenna system incorporating an antenna assembly having a plurality of antennas each associated with a plurality of polarisations, characterised in that the method includes combining onto a single feeder signals associated both with like polarisation and with a plurality of the base stations, and separating on to different feeders signals associated with different polarisations for at least one of transfer of signals from antennas to base stations in receive mode and transfer of signals from base stations to antennas in transmit mode.

In order that the invention might be more fully understood, embodiments thereof will now be described, by way of example only, with reference to the accompanying drawings, in which.

Figure 1:
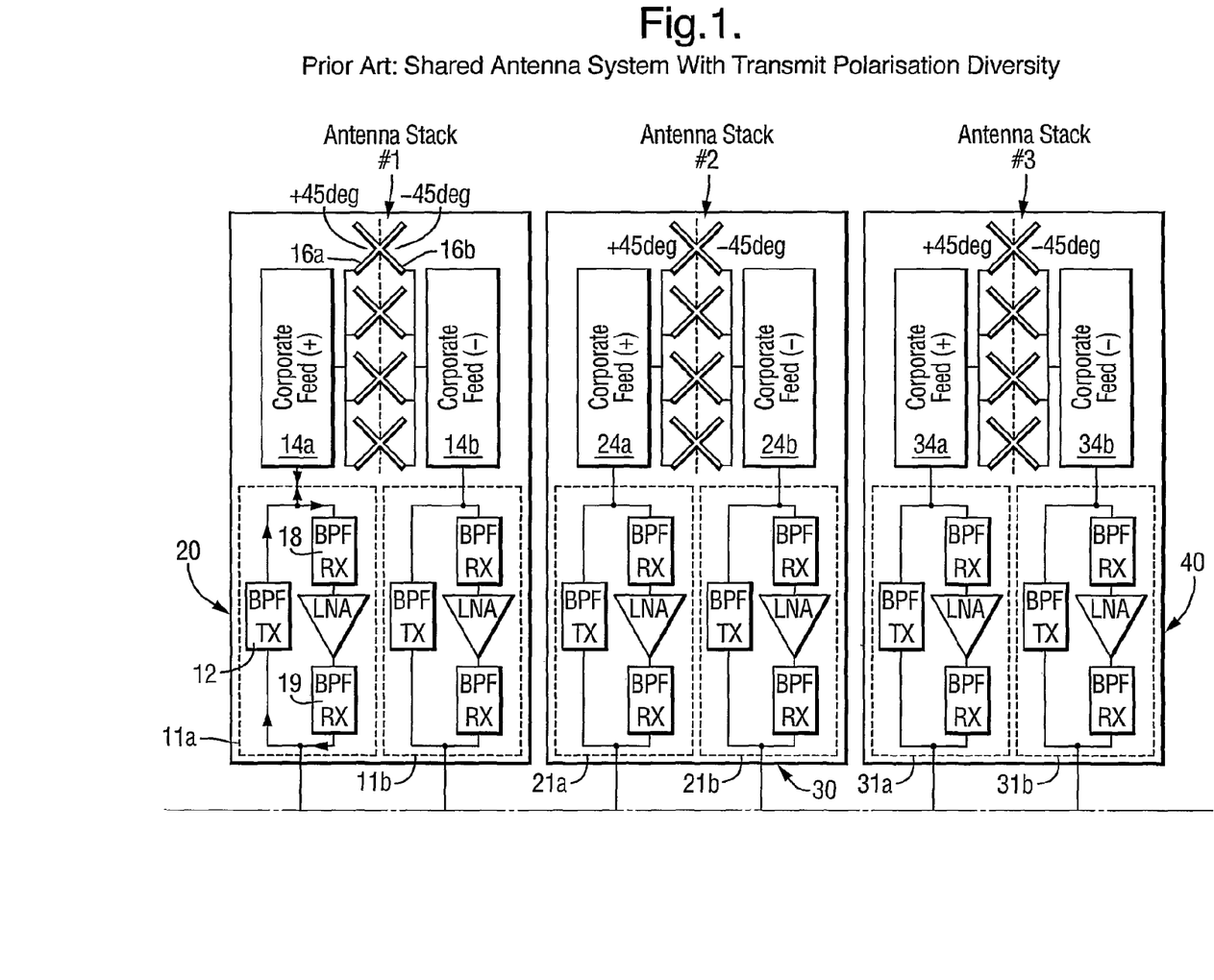
FIG. 1 is a block diagram of a prior art shared antenna system with both receive and transmit polarisation diversity.

Referring to FIG. 1, reference numeral 10 indicates generally a prior art shared antenna system with transmit and receive polarisation diversity typical of that commonly in use. The system 10 is intended to transmit to one sector in a horizontal plane: It has three base stations #1, #2 and #3, each having two ports (e.g. T1(+)/R1(+)): as is conventional each port is configured for both receive and transmit, or input/output, so it outputs transmit signals and inputs receive signals. The system 10 is arranged to transmit (TX) and receive (RX) signals at mutually orthogonal polarisations of +45 degrees and −45 degrees relative to one another via respective antenna stacks #1, #2 and #3 in respective radomes indicated by rectangles 20, 30 and 40.

At the first base station #1, a TX signal intended for transmission from antenna stack #1 at +45 degrees polarisation is fed to a first feeder F1a and thence up an antenna support mast (not shown) to the first radome 20. It will be appreciated that TX signals and receive or RX signals to be described later do not have polarisations within the antenna system 10, but only after transmission from an antenna (TX) or upon receipt by an antenna (RX) respectively. However it is convenient to label these signals with (+) or (−) indicating an intention to transmit from or prior reception at positive or negative polarisation antenna elements.

At the first radome 20, the TX(+) signal intended for transmission from antenna stack #1 at +45 degrees polarisation passes into a transmit/receive filtering unit 11a indicated within dotted lines. In this unit 11 it passes through a transmit band pass filter (TX BPF) 12, from which it is output to the antenna stack #1 via a corporate feed network 14a. The network 14a is of known kind: it is a cascaded array of signal splitters arranged to convert the TX signal into a set of antenna element signals each fed to a respective antenna element such as 16 in a +45 degrees polarisation half (indicated by "+45") of the antenna stack #1.

The corporate feed network 14a also operates in reverse as a signal combiner. Consequently RX(+) signals received by respective antenna elements such as 16a in the +45 degrees polarisation half of the antenna stack #1 are combined into a single signal by the network 14a. This RX(+) signal passes into the filtering unit 11a: here it passes through a receive band pass filter (RX BPF) 18, from which it is output to a low noise amplifier LNA and thence to a second receive band pass filter (RX BPF) 19, which provides a low impedance path to the feeder F1a at frequencies within this second filter's pass band only. The second receive band pass filter 19 is effectively an open circuit at frequencies outside this band such as those used by other base stations #2 and #3. The RX(+) signal is output from the second RX BPF filter 19 to the first feeder F1a and is relayed along it to the first base station #1.

Similarly TX(−) and RX(−) signals pass to and from a −45 degrees polarisation half (indicated by "−45") of the antenna stack #1 via a corporate feed network 14b and filtering unit 11b equivalent to the network 14a and unit 11a. The antenna stack #1, corporate feed networks 14a/14b and filtering units 11a/11b are housed in the radome 20.

All three base stations #1, #2 and #3 are equivalent to one another. Consequently, the second and third base stations #2 and #3 are associated with respective signal feeds F2a/F2b, F3a/F3b, filtering units 21a/21b, 31a/31b, corporate feeds 24a/24b, 34a/34b, antenna stacks #2/#3 and radomes 30, 40 equivalent to the like for the first base station #1. All three base stations #1, #2 and #3 have both transmit and receive polarisation diversity since they all transmit and receive two polarisations.

The disadvantages of the prior art shared antenna system 10 are as follows:
a) the number of radomes required per sector can result in an installation that is visually obtrusive to the public and to planning or zoning authorities. FIG. 1 shows three radomes per sector: in practice there may be two to five operators per band requiring two to five radomes per sector; if three signal wavebands are simultaneously in use then a sector may have from six to fifteen radomes per sector mounted on one to three antenna support gantries;
b) the size and weight of the antenna system 10 requires a substantial mast assembly capable of withstanding wind loading and weight of radomes and feeders, further increasing cost and visual impact on the environment;
c) feeders are used to carry both transmit and receive signals: consequently signal frequency intermodulation products are generated in the feeders and their connectors, and appear at the input to receivers of the base stations #1, #2 and #3 with the possibility of signal interference and a reduction in effective receiver sensitivity. This may be avoided by replicating signal feeders to separate TX and RX signal paths, with consequent increase in mast wind loading, weight and cost, i.e. twelve feeders instead of six;
d) even if only receive polarisation diversity is used, i.e. transmit polarisation diversity is omitted, this has no effect on the required number of feeders F1a etc.

Figure 2:
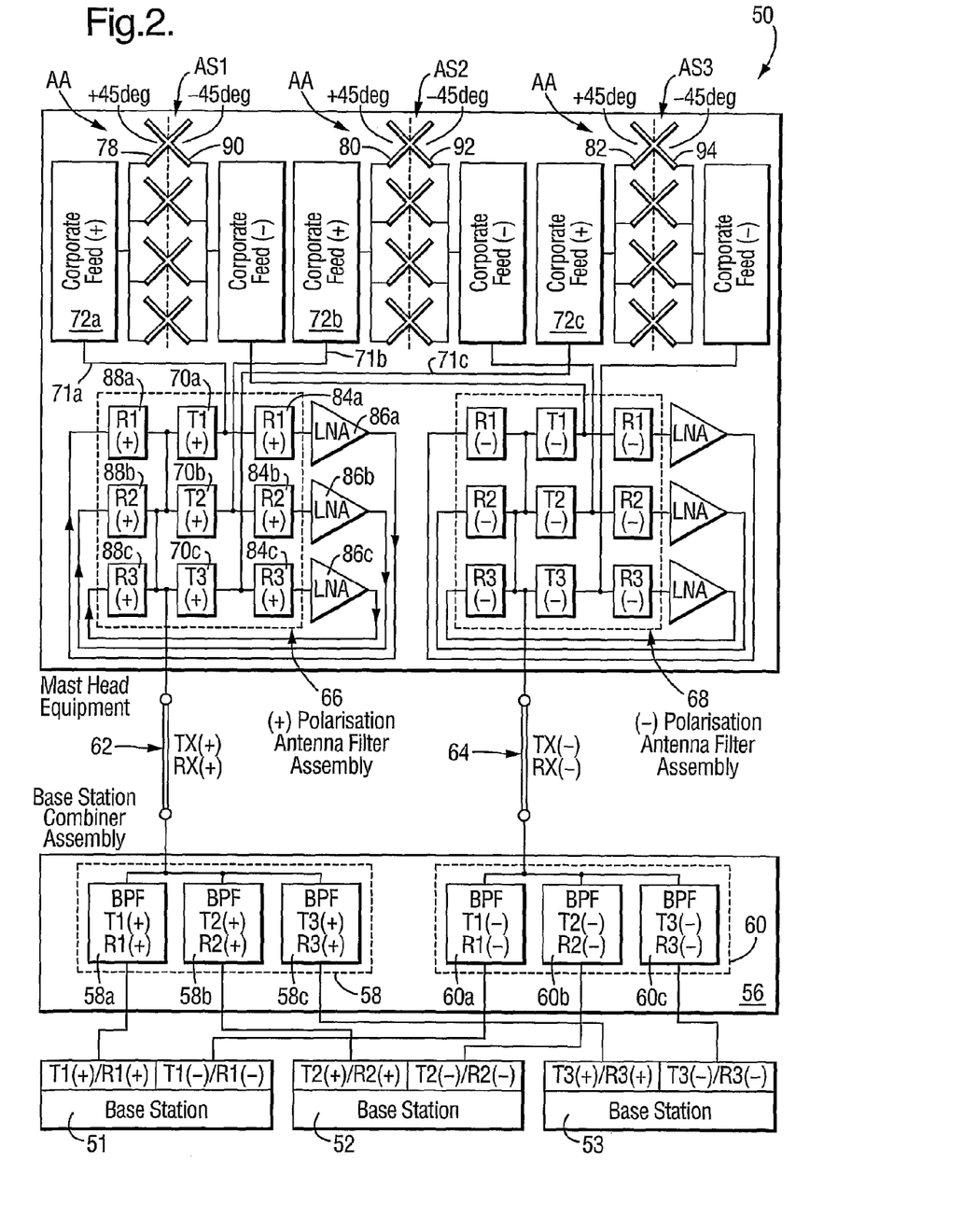
FIG. 2 is a block diagram of a shared antenna system of the invention with both receive and transmit polarisation diversity and employing two feeders.

FIG. 2 shows an antenna system of the invention indicated generally by 50 for three base stations 51, 52 and 53. The base station 51 is arranged to generate two transmit signals T1(+) and T1(−) intended respectively for positive (+45 degree) and negative (−45 degree) polarisations of a first antenna consisting of an antenna stack AS1. Similar pairs of transmit signals T2(+)/T2(−), T3(+)/T3(−) are generated by base stations 52 and 53 for positive and negative polarisations of second and third antennas consisting of antenna stacks AS2 and AS3. The antenna stacks AS1 to AS3 form an antenna assembly AA. The base stations 51 to 53 have different transmit frequencies.

The transmit signals T1(+)/T1(−), T2(+)/T2(−) and T3(+)/T3(−) are fed to a combiner assembly 56 having a first bank 58 of three band pass filters (BPF) 58a, 58b and 58c associated with positive polarisation and a second bank 60 of three band pass filters 60a, 60b and 60c associated with negative polarisation. The transmit signals T1(+), T2(+) and T3(+) associated with positive polarisation from all three base stations 51, 52 and 53 are fed to the first bank 58 and are filtered by respective band pass filters 58a to 58c. These filters have pass bands centred on transmit and receive frequencies of respective base stations 51 to 53, and they isolate the base stations from one another. After filtering these signals are combined on to a first common feeder 62, so the filters 58a, 58b and 58c act as combining filters. Similarly, the transmit signals T1(−), T2(−) and T3(−) associated with negative polarisation are fed to the second bank 60 and are filtered by respective filters 60a, 60b and 60c. After filtering these signals are combined on to a second common feeder 64.

The feeders 62 and 64 are connected to first and second filter assemblies 66 and 68 (dotted lines) respectively which are mounted on an antenna mast (not shown). The first filter assembly 66 contains three transmit filters 70a, 70b and 70c having pass bands centred on transmit frequencies of respective base stations 51, 52 and 53: these filters have inputs all connected to the first feeder 62 and outputs connected to positive polarisation corporate feeds 72a, 74a and 76a of the antenna stacks AS1, AS2 and AS3 respectively. The first filter assembly 66 contains three band pass transmit filters 70a, 70b and 70c having pass bands centred on transmit frequencies of the base stations 51, 52 and 53 respectively. The transmit signal T1(+) associated with positive polarisation from the first base station 51 passes through transmit filter 70a, along a connection 71a to a corporate feed 72a and then to +45 degree polarisation antenna elements such as 78 of the first antenna stack AS1. Similarly, transmit signals T2(+) and T3(+) associated with positive polarisation from the second and third base stations 52 and 53 pass through respective transmit filters 70b/70c, connections 71b/71c and corporate feeds 72b/72c to +45 degree polarisation antenna elements such as 80 and 82 of the second and third antenna stacks AS2 and AS3. The three transmit filters 70a, 70b and 70c therefore act as separating filters to separate the three transmit signals T1(+), T2(+) and T3(+) combined on the first feeder 62 and route them to different antenna stacks AS1, AS2 and AS3 respectively.

A signal R1(+) received by +45 degree polarisation antenna elements (e.g. 78) of the first antenna stack AS1 passes via the connection 71a to the first filter assembly 66. Here it is filtered by a first receive filter 84a, amplified by a low noise amplifier (LNA) 86a and then filtered by a second receive filter 88a to enable it to be combined with other signals on the first feeder 62. It then passes via the first feeder 62 to the combiner assembly 56 and first bank 58 of band pass filters 58a, 58b and 58c associated with positive polarisation, these filters operating in both forward direction in transmit mode and reverse direction in receive mode. The receive signal R1(+) is within the pass band of the left hand filter 58a: it therefore passes to the first base station 51 connected to the filter 58a and is designated as a positive polarisation signal. This signal is required to pass through the same filter 58a as the transmit signal T1(+) of like polarisation, albeit in the reverse direction. This is because, as described with reference to FIG. 1, the base station 51 has a respective single port (T1(+)/R1(+) in this case) for both transmit and receive signals associated with positive polarisation.

Similarly, signals R2(+) and R3(+) received by +45 degree polarisation antenna elements (e.g. 80, 82) of the second and third antenna stacks AS2/AS3 pass via respective connections 71b/71c to the first filter assembly 66 for filtering at 84b/84c, amplification at 86b/86c and more filtering at 88b/88c respectively. After traversing the first feeder 62, they are separated by filters 58b and 58c and pass to the second and third base stations 52 and 53 respectively.

Transmit signals T1(−), T2(−) and T3(−) associated with negative polarisation generated by the base stations 51 to 53 as mentioned above pass via the second common feeder 64 to the second filter assembly 68. The second filter assembly 68 has components and a mode of operation equivalent to those of the first filter assembly 66, and will not be described in detail. It separates the three transmit signals T1(−), T2(−) and T3(−) by filtering and routes them to negative polarisation (−45 degree) elements (e.g. 90, 92, 94) of antenna stacks AS1, AS2 and AS3 respectively for transmission.

Similarly, signals R1(−), R2(−) and R3(−) received by negative polarisation antenna elements (e.g. 90, 92, 94) of the antenna stacks AS1, AS2 and AS3 are filtered, amplified and filtered once more in the second filter assembly 68. After traversing the second feeder 64, they are separated by filters 60a, 60b and 60c and pass to the first, second and third base stations 51, 52 and 53 respectively.

The antenna system 50 of the invention allows each of three operators or base stations 51 to 53 to have a respective angle of electrical tilt, since each base station 51, 52 or 53 sends signals to and receives signals from a respective antenna stack AS1, AS2 or AS3: e.g. antenna stack AS1 receives signals from and passes signals to the first base station 51 only. Similarly antenna stacks AS2 and AS3 are associated with the second and third base stations 52 and 53 respectively. This allows an individual angle of electrical tilt to be provided for each operator, since each antenna stack AS1, AS2 or AS3 is operated independently of the other two. It is possible to have more than one base station using any of the antenna stacks AS1 to AS3, but if so base station operators sharing an antenna stack would have to use the same angle of electrical tilt.

The antenna system 50 also allows operators to share a single antenna assembly AA that provides transmit diversity, polarisation diversity in receive, and a reduced number of combining and splitting filters. It achieves this using only two feeders, compared to six feeders in the prior art 10. It groups signals passing to or from the positive (+) polarisation antenna elements e.g. 78, 80 and 82 of each stack into a first group, and those passing to or from the negative (−) polarisation antenna elements e.g. 90, 92, 94 into a second group. The feeders 62 and 64 are used to carry both multi-carrier transmit and receive signals, and consequently signal frequency intermodulation products are generated in the feeders and their connectors. This example is therefore suitable for use where operating frequencies do not give rise to any significant intermodulation products, so that transmit and receive signals may share the same feeder resulting in a two feeder implementation.

The antenna system 50 may be used with base stations operating in different bands, or with base stations operating in the same band provided operator frequencies are not contiguous: in this regard the non-contiguity criterion enables signal combining and splitting to be implemented with practically realisable filters, i.e. there is no requirement for infinitely sharp filter cut-on and cut-off which are unobtainable in practice.

In the antenna system 50, with three operators having respective base stations 51, 52 and 53 and respective frequency bands 1, 2 and 3, then as previously described:

1. signals for transmission from respective antenna stacks (AS1, AS2 and AS3) with positive polarisation are T1(+), T2(+) and T3(+);
2. signals for transmission from respective antenna stacks (AS1, AS2 and AS3) with negative polarisation are T1(−), T2(−) and T3(−);
3. signals received with positive polarisation signals at respective antenna stacks AS1, AS2 and AS3 are R1(+), R2(+) and R3(+); and
4. signals received with negative polarisation at respective antenna stacks AS1, AS2 and AS3 are R1(−), R2(−) and R3(−).

In order to use conventional filtering to separate signals which are on the same feeder, the signals must have different non-contiguous frequencies, i.e. the frequencies must be spaced apart. Consequently, in the antenna system 50, signals of the same frequency are on separate feeders 62 and 64. Since transmit signals associated with either polarisation have different frequencies to receive signals, transmit and receive signals can be on the same feeder and be separated by filtering.

It is convenient to have on the first feeder 62 transmit and receive signals such as Tn(+) and Rn(+) (n=1 to 3) both associated with positive polarisation, and on the second feeder 64 transmit and receive signals Tn(−) and Rn(−) associated with negative polarisation. However, it is also possible, albeit somewhat less convenient, to have Tn(+) and Rn(−) on one feeder, and Tn(−) and Rn(+) on a second feeder: i.e. signals of different types (transmit and receive) of different polarisations can appear on the same feeder because they have different frequencies which are separable.

It is not appropriate to have Tn(+) with Tn(−), or Rn(+) with Rn(−), on the same feeder because they have like frequencies which are not separable by conventional filtering. This principle extends to multiple operators in the same band (with non-contiguous frequencies), or multi-band use, provided signals with the same frequency do not appear on the same feeder.

The antenna system 50 may be adapted to have spatial diversity instead of polarisation diversity. This can be implemented by replacing each of the antenna stacks AS1 to AS3 by two spatially separate antenna stacks of the order of one meter apart for ~2 GHz frequency operation. Tn(+) and Tn(−) are then transmitted from and Rn(+) and Rn(−) are received at different antenna stacks at different locations. Tn(+)/Rn(+) are then associated with a different diversity type to Tn(−)/Rn(−), because of the different transmit/receive location. This is analogous to the different diversity types of Tn(+)/Rn(+) and Tn(−)/Rn(−) when the symbols "+" and "−" represent different polarisation associations.

Figure 3:
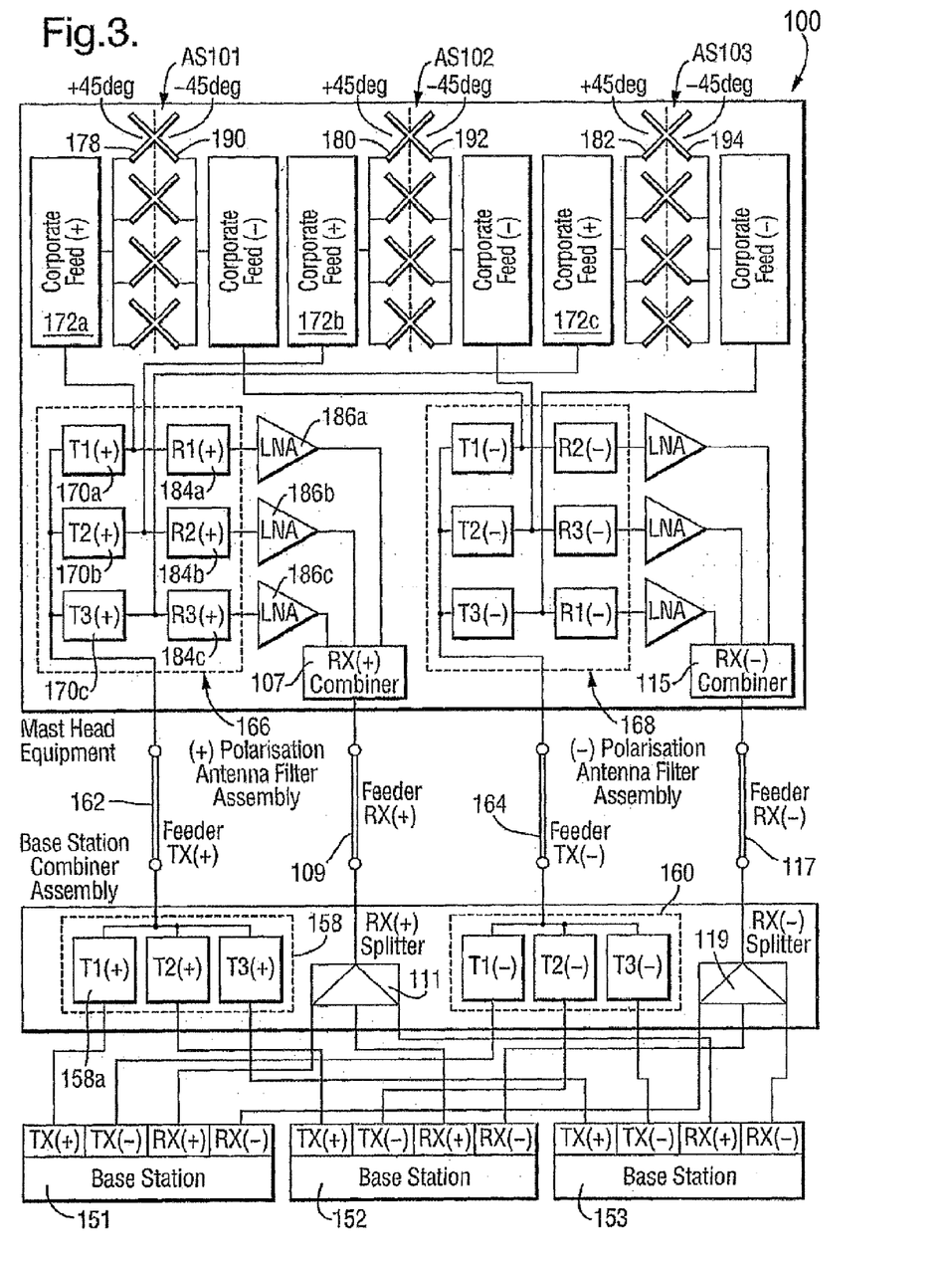
FIG. 3 is a block diagram of a shared antenna system of the invention with both receive and transmit polarisation diversity and employing four feeders to separate receive and transmit signals.

Referring now to FIG. 3, there is shown a further antenna system 100 of the invention adapted to have separate feeders for transmit and receive signals while retaining both transmit and receive diversity. Parts equivalent to those described earlier are like referenced with a prefix 100. Apparatus and mode of operation for transmit mode are as described with reference to FIG. 2 and will not be described further.

For receive mode and positive polarisation, the antenna system 100 has apparatus and mode of operation equivalent to those described earlier until outputs from low noise amplifiers 186a to 186c are obtained. These outputs are combined by a combiner 107 and fed on to a common receive (+) feeder 109. The feeder 109 transfers the receive (+) signals to a receive (+) splitter 111, which divides the combined signals into three equal powers and sends them to respective base stations 151, 152 and 153. Each of the base stations 151, 152 and 153 is tuned to a respective receive frequency, so it is not necessary to have additional filters to separate receive signals.

For receive mode and negative polarisation, the antenna system 100 has replicated apparatus and mode of operation equivalent to those described for receive mode and positive polarisation. Here RX(−) receive signals are combined at 115 on to a common receive (−) feeder 117, and split between base stations 151, 152 and 153 at 119.

The antenna system 100 is a four feeder, triple antenna stack installation that provides (a) receive polarisation diversity, (b) amplification of receive signals, (c) transmit diversity, and (d) separate transmit and receive feeders to reduce the possibility of interference from intermodulation products.

Figure 4:
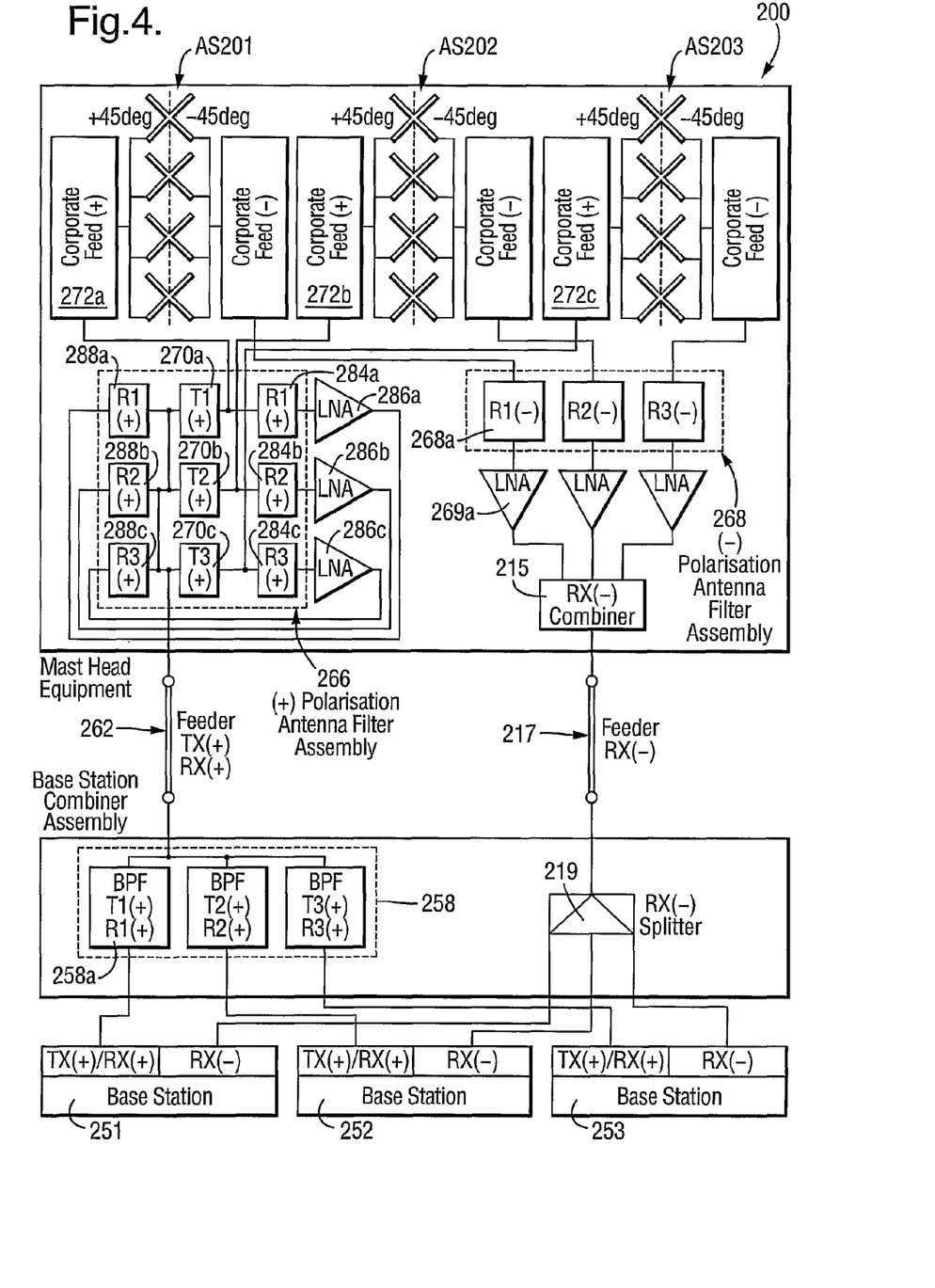
FIG. 4 is a block diagram of a shared antenna system of the invention employing receive diversity only and using two feeders.

Referring now to FIG. 4, there is shown a further antenna system 200 of the invention providing receive polarisation diversity only. Parts equivalent to those described earlier are like referenced with a prefix 200. Elements on the left hand side of the drawing between base stations 251 to 253 and antenna stacks AS201 to AS203 including transmit (+)/receive (+) feeder 262 and filter assembly 266 are equivalent to and have the same mode of operation as corresponding parts of FIG. 2, and will not be described.

Apparatus on the right hand side of FIG. 4 between base stations 251 to 253 and antenna stacks AS201 to AS203 including receive (−) combiner 215, receive (−) feeder 217 and splitter 219 are equivalent to and have the same mode of operation as corresponding parts of FIG. 3. This apparatus is equivalent to the right hand side of FIG. 3 with the removal of all transmit filters (T1(−) to T3(−) at 160 and 168 and the TX(−) feeder 164. The antenna system 200 therefore has a combination of transmit (+) and receive (+) signals on left hand feeder 262, but only receive (−) signals on right hand feeder 217. It is therefore suitable for applications requiring receive diversity but not transmit diversity, and in which operators' frequencies are not contiguous. Contiguous frequencies are preferably combined losslessly using different antenna polarisations, as disclosed in published International Application No. WO 02/082581.

Figure 5:
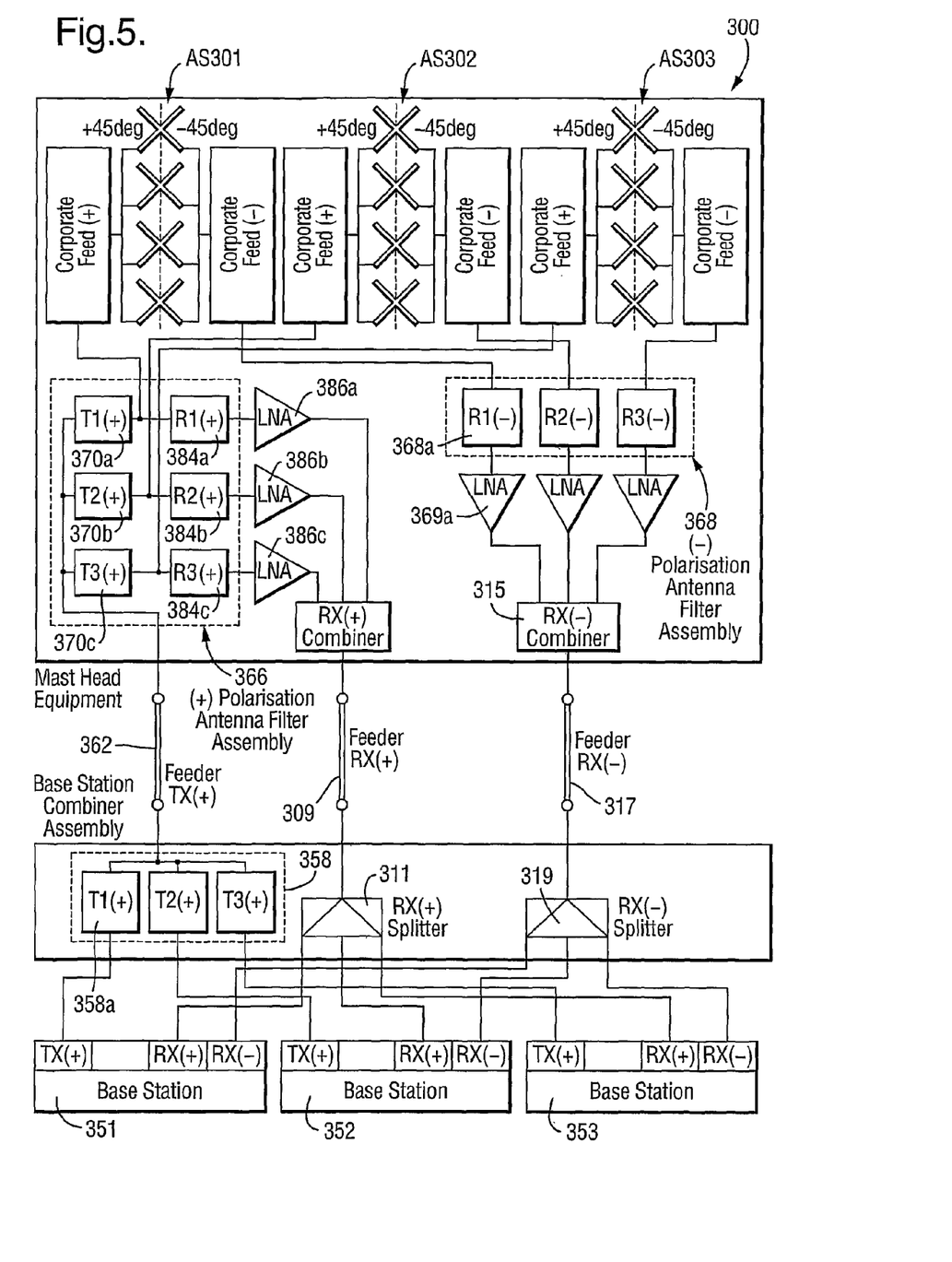
FIG. 5 is a block diagram of a shared antenna system of the invention employing receive diversity only and using three feeders to separate receive and transmit signals.

Referring now to FIG. 5, there is shown a further antenna system 300 of the invention adapted to separate transmit signals from receive signals and having diversity in receive mode only. Parts equivalent to those described earlier are like referenced with a prefix 300 replacing 100. The antenna system 300 is equivalent to that described with reference to FIG. 3 with the removal of all transmit filters (T1(−) to T3(−) at 160 and 168 and the TX(−) feeder 164. The antenna system 300 therefore has a transmit (+) signal on left hand feeder 362, a receive (+) signal on central feeder 309, and a receive (−) signals on right hand feeder 317. It is therefore suitable for applications requiring receive diversity but not transmit diversity, and in which transmit and receive signals are required to be conveyed on separate feeders.

Figure 6:
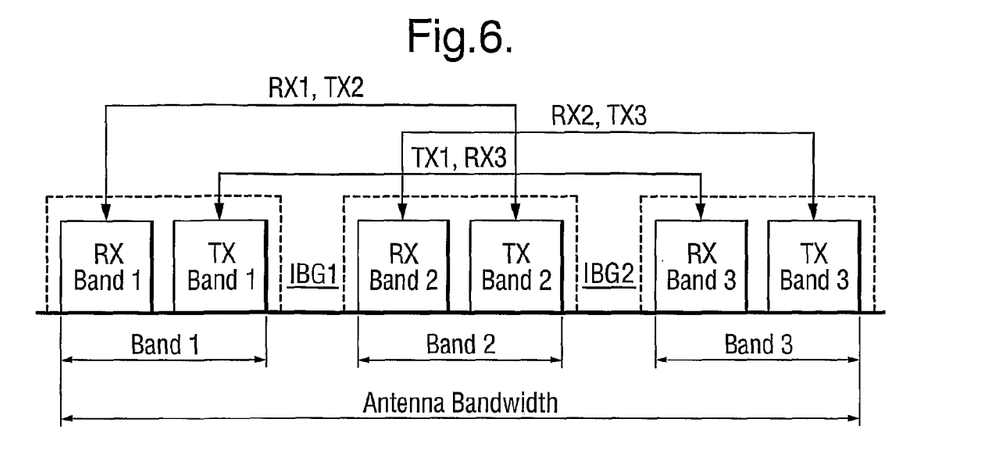
FIG. 6 illustrates combining of frequency bands in duplex pairs.

FIG. 6 shows grouping of transmit and receive frequency bands so that they are well spaced apart in frequency and hence have reduced complexity of implementation of filtering in the antenna filter assemblies 166 and 168 of FIG. 3. There are three frequency bands, bands 1 to 3, and each band has spaced apart transmit TX and receive RX frequencies; i.e. band 1 has TX1/RX1, band 2 has TX2/RX2 and band 3 has TX3/RX3. The pairing is between RX1 and TX2, TX1 and RX3, and RX2 with TX3. This gives separation in each case by a complete band (or the equivalent of two half bands) and at least one interband gap IBG 1 and/or IBG2. In order to use well spaced duplex filters it is necessary to use a multi-band or broadband antenna stack, and a common angle of electrical tilt is to be acceptable to operators sharing a stack.

Figure 7:
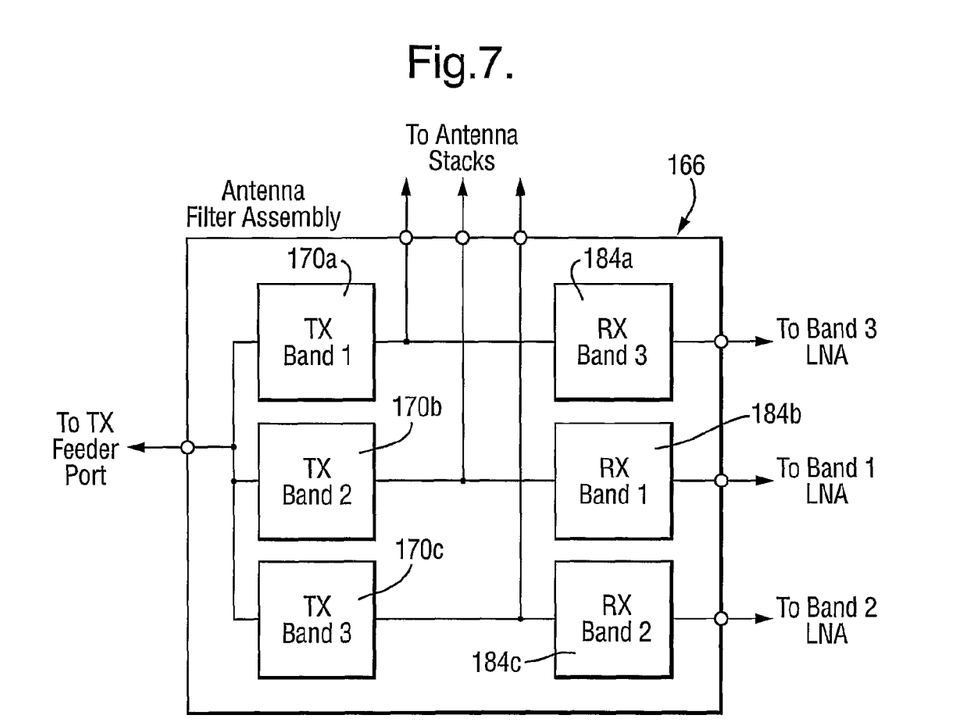
FIG. 7 illustrates a combining filter arrangement for use with the embodiments shown in FIGS. 3 and 5.

FIG. 7 shows filter pairings for wide frequency spacing in the antenna filter assemblies 166/168 and 366/368 in FIGS. 3 and 5, based on the associations shown in FIG. 6.

Figure 8:
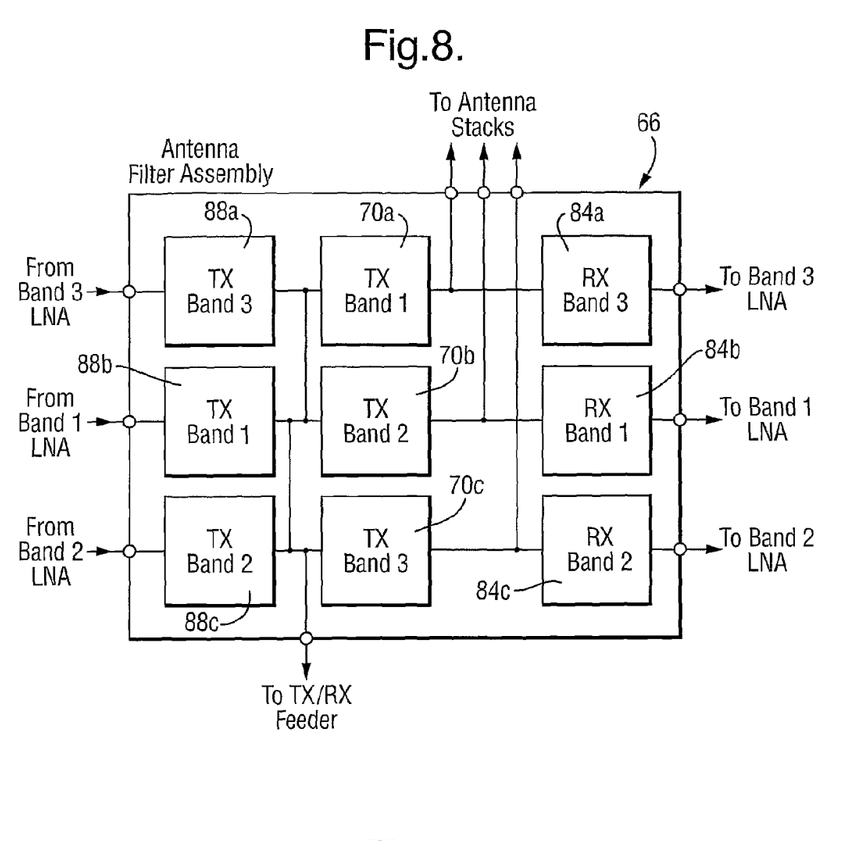
FIG. 8 illustrates a combining filter arrangement for use with the embodiments shown in FIGS. 2 and 4.

FIG. 8 shows the combining filter frequency pairings for wide frequency spacing of the antenna filter assemblies 66/68 and 266/268 shown in FIGS. 2 and 4, based on the associations shown in FIG. 6.

Figure 9:
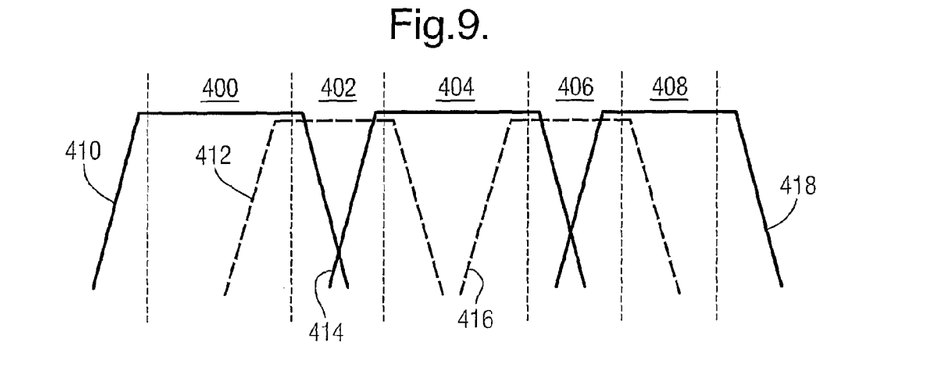
FIG. 9 illustrates filter characteristics for contiguous frequency bands.

The examples of the invention hereinbefore described are suitable for use with frequencies which are separable by conventional filtering: this implies that the frequencies are non-contiguous where they are to be separated by filters, i.e. there are spaces between adjacent frequency bands. Referring now to FIG. 9, five contiguous frequency bands 400 to 408 are indicated by respective pairs of adjacent chain lines which delimit them. If it is attempted to separate these frequencies using conventional filters, such filters would have pass bands indicated by 410 to 418 respectively. Here for clarity passbands 412 and 416 have been displaced downwards slightly relative to pass-bands 410, 414 and 418. This drawing illustrates the fact that filters are not perfect, i.e. they cannot have pass-bands with accurately located, infinitely sharp cut-on and cut-off.

Adjacent pairs of pass-bands such as 410 and 412 overlap seriously because of finite slope of the filter characteiristics: this gives rise to two deleterious effects, increased signal loss in the overlap region and reduced isolation between signals. The reason for the increased signal loss and reduced isolation is associated with the use of feeders carrying a combination of signals. In order to combine signals efficiently, the electrical impedance across each filter pass-band 410 to 418 must be maintained at some nominal value, e.g. 50 ohms. When passbands overlap as shown in FIG. 9, this nominal impedance cannot be maintained: this results in (a) loss in signal coupling to a feeder and distortion of signal waveform, (b) a proportion of each signal coupling into adjacent filters and hence into other base stations. Coupling of a signal into the output of a transmitter results in inter-modulation products being generated in the transmitter's output stage which is non-linear. These products become uncontrolled spurious emissions which, if large enough, can exceed the level permitted by the regulatory authorities which oversee communications of this kind.

Figure 10:
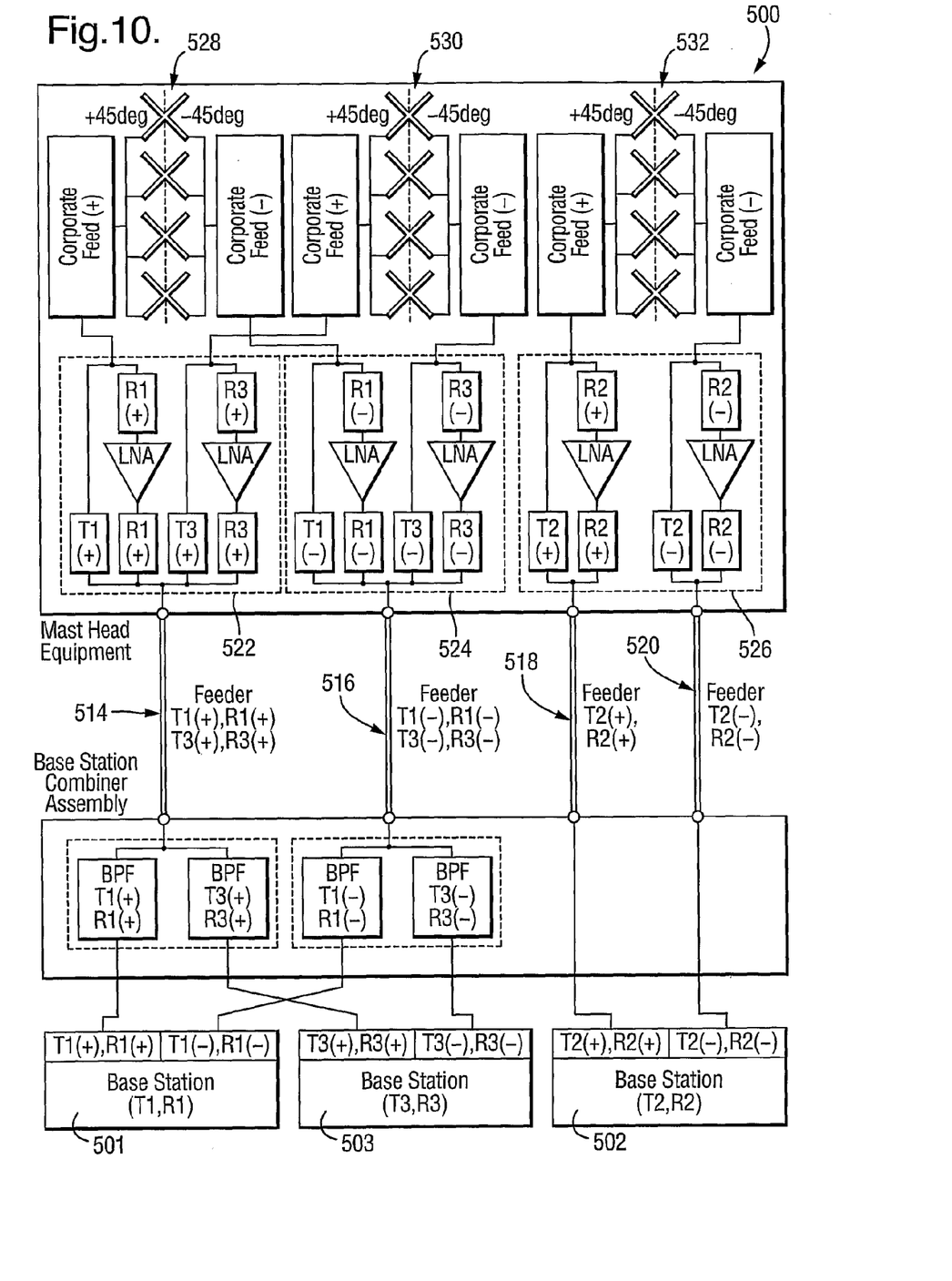
FIG. 10 is a block diagram of a shared antenna system of the invention for use with base stations having contiguous frequency bands.

Referring now also to FIG. 10, a further example of an antenna system 500 of the invention is shown which is suitable for use with first, second and third base stations 501, 502 and 503 operating at contiguous frequencies. The base stations 501, 502 and 503 have respective transmit frequency bands located relative to one another as shown at 410, 412 and 414 in FIG. 9, and their receive frequency bands are similarly located relative to one another. Consequently, the second base station's operating frequencies are contiguous with those of the first and third base stations 501 and 503, but the first and third base stations 501 and 503 have operating frequencies which are not contiguous with one another.

The antenna system 500 is constructed and operates similarly to embodiments described earlier and will not be described in detail. It has filters 510, 512 for combining transmit signals on to first and second feeders 514 and 516. Third and fourth feeders 518 and 520 are connected directly to (+) and (−) ports of the second base station 502, and three filter/amplifier assemblies 522, 524 and 526 relay signals to and from antenna stacks 528, 530 and 532. Each of the antenna stacks 528, 530 and 532 receives signals from and sends signals to a respective base station 501, 502 or 503. The first feeder 514 carries signals T1(+), T3(+), R1(+), R3(+) associated with positive polarisation to and from the first and third base stations 501 and 503. The second feeder 516 carries signals T1(−), T3(−), R1(−), R3(−) associated with negative polarisation to and from the first and third base stations 501 and 503. The third and fourth feeders 518 and 520 carry signals T2(+), R2(+), T2(−), R2(−) associated with positive and negative polarisation respectively to and from the second base station 502. The result of this arrangement is that each of the feeders 514 to 520 only carries signals which are well separated in frequency: the signals on each feeder are non-contiguous and non-overlapping and can therefore be separated by filtering, e.g. signals T1(+) and T3(+) from the first and third base stations 501 and 503.

The antenna assembly 500 provides the following advantages:
a) An individual angle of electrical tilt for each operator, because each antenna stack serves one base station only;
b) Polarisation diversity in both transmit and receive;
c) Capability for signals having contiguous frequencies; and
d) Lossless combining of signals at antenna stacks.

The invention claimed is:

1. An antenna system for shared operation in association with a plurality of base stations, wherein the antenna system comprises:
a plurality of antennas each arranged to transmit and receive for at least one respective base station; and
circuitry for processing on to at least one feeder of a plurality of different feeders, signals with different non-contiguous frequencies associated with the plurality of the base stations, and for processing on to different feeders of the plurality of different feeders, signals with at least one of: contiguous, overlapping and like frequencies for at least one of a transfer of signals from the antennas to the base stations in a receive mode and a transfer of signals from the base stations to the antennas in a transmit mode, wherein the circuitry is for processing transmit signals on to feeders of the plurality of different feeders that are different to those feeders of the plurality of different feeders that are associated with receive signals, the circuitry having:
one bandpass filter per base station per polarisation for combining base station transmit signals of a first polarisation on to a first single feeder of the plurality of different feeders and base station transmit signals of a second polarisation on to a second feeder of the plurality of different feeders;
one bandpass filter per antenna per polarisation of the first polarisation and the second polarisation for separating base station transmit signals for routing to different antennas;
one bandpass filter and one low noise amplifier per antenna per polarisation and one combiner per polarisation for combining antenna receive signals of the first polarisation on to a third feeder of the plurality of different feeders and antenna receive signals of the second polarisation on to a fourth feeder of the plurality of different feeders; and
one splitter per polarisation of the first polarisation and the second polarisation for routing antenna receive signals from the third feeder and the fourth feeder to different base stations of the plurality of base stations.

2. A method of shared operation of an antenna assembly having a plurality of antennas for use with a plurality of base stations wherein each antenna is used to transmit and receive for at least one respective base station and the method comprises:
processing on to at least one feeder of a plurality of different feeders, signals with different noncontiguous frequencies associated with the plurality of the base stations, and processing on to different feeders of the plurality of different feeders, signals with at least one of: contiguous, overlapping and like frequencies for at least one of a transfer of signals from the antennas to the plurality of base stations in a receive mode and a transfer of signals from the plurality of base stations to the antennas in a transmit mode, wherein the processing comprises:
combining base station transmit signals associated with like polarisation on to a first feeder of the plurality of different feeders;
combining antenna receive signals associated with like polarisation on to a second feeder of the plurality of different feeders;
separating base station transmit signals associated with different polarisations on to the first feeder and a third feeder of the plurality of different feeders; and
separating antenna receive signals associated with different polarisations on to the second feeder and a fourth feeder of the plurality of different feeders.

3. The method according to claim 2 wherein each antenna is used to transmit for one respective base station.

4. The method according to claim 3 wherein the antenna assembly provides an individual angle of electrical tilt per base station.

5. The method according to claim 2 including combining transmit signals on to different feeders to receive signals.

6. The method according to claim 2 wherein each base station has a respective transmit/receive band spaced from another such band by an intervening gap, the another such band and gap having a combined width, and wherein the method includes duplex filtering frequencies of pairs of transmit and receive signals for duplex filtering with intervening frequency differences which are equal to at least the combined width.

7. A method of shared operation of an antenna assembly having a plurality of antennas for use with a plurality of base stations wherein each antenna is used to transmit and receive for at least one respective base station and the method comprises:
processing on to at least one feeder of a plurality of different feeders, signals with different noncontiguous frequencies associated with the plurality of the base stations, and processing on to different feeders of the plurality of different feeders, signals with at least one of: contiguous, overlapping and like frequencies for at least one of a transfer of signals from the antennas to the plurality of base stations in a receive mode and a transfer of signals from the plurality of base stations to the antennas in a transmit mode, wherein the processing employs:

one bandpass filter per base station per polarisation for combining base station transmit signals of a first polarisation on to a first feeder of plurality of different feeders and base station transmit signals of a second polarisation on to a second feeder of the plurality of different feeders;

one bandpass filter per antenna per polarisation of the first polarisation and the second polarisation for separating base station transmit signals for routing to different antennas;

one bandpass filter and one low noise amplifier per antenna per polarisation and one combiner per polarisation for combining antenna receive signals of the first polarisation on to a third feeder of the plurality of different feeders and antenna receive signals of the second polarisation on to a fourth feeder of the plurality of different feeders; and one splitter per polarisation of the first polarisation and the second polarisation for routing antenna receive signals from the third feeder and the fourth feeder to different base stations of the plurality of base stations.

8. An antenna system for shared operation in association with a plurality of base stations, wherein the antenna system comprises:

a plurality of antennas each arranged to transmit and receive for at least one respective base station; and circuitry for processing on to at least one feeder of a plurality of different feeders, signals with different non-contiguous frequencies associated with the plurality of base stations, and for processing on to different feeders of the plurality of different feeders, signals with at least one of: contiguous, overlapping and like frequencies for at least one of a transfer of signals from the antennas to the base stations in a receive mode and a transfer of signals from the base stations to the antennas in a transmit mode, wherein the circuitry is for:

combining base station transmit signals associated with like polarisation on to a first feeder of the plurality of different feeders;

combining antenna receive signals associated with like polarisation on to a second feeder of the plurality of different feeders;

separating base station transmit signals associated with different polarisations on to the first feeder and a third feeder of the plurality of different feeders; and separating antenna receive signals associated with different polarisations on to the second feeder and fourth feeder of the plurality of different feeders.

9. The antenna system according to claim 8 wherein each antenna is for transmitting for one respective base station.

10. The antenna system according to claim 9 for providing an individual angle of electrical tilt for each base station.

11. The antenna system according to claim 8 wherein each base station has a respective transmit/receive band spaced from another such band by an intervening gap, and frequencies of pairs of transmit and receive signals are arranged for duplex filtering with intervening frequency differences which are equal to at least the combined width of a gap and a band.

* * * * *